United States Patent
Costa-Requena et al.

(10) Patent No.: US 9,372,839 B2
(45) Date of Patent: Jun. 21, 2016

(54) RENDERING SYSTEM

(71) Applicant: BOOXMEDIA OY, Helsinki (FI)

(72) Inventors: Jose Costa-Requena, Helsinki (FI); Tomi Myllylä, Espoo (FI); Jukka Sintonen, Helsinki (FI)

(73) Assignee: BOOXMEDIA OY, Helsinki (FI)

( * ) Notice: Subject to any disclaimer, the term of this patent is extended or adjusted under 35 U.S.C. 154(b) by 0 days.

(21) Appl. No.: 14/370,806

(22) PCT Filed: Jan. 9, 2013

(86) PCT No.: PCT/FI2013/050016
§ 371 (c)(1),
(2) Date: Jul. 7, 2014

(87) PCT Pub. No.: WO2013/104825
PCT Pub. Date: Jul. 18, 2013

(65) Prior Publication Data
US 2014/0365856 A1    Dec. 11, 2014

(30) Foreign Application Priority Data
Jan. 10, 2012    (FI) ..................................... 20125024

(51) Int. Cl.
    *G06F 17/00*      (2006.01)
    *G06F 17/22*      (2006.01)
    (Continued)

(52) U.S. Cl.
    CPC ........ *G06F 17/2247* (2013.01); *G06F 17/2235* (2013.01); *H04L 12/2812* (2013.01);
    (Continued)

(58) Field of Classification Search
    CPC ............ G06F 17/2247; G06F 17/2235; H04L 67/025; H04L 12/2812; H04L 12/2814; H04L 67/0025; H04L 67/16; H04L 65/4804; H04N 21/436; H04N 21/6175
    See application file for complete search history.

(56) References Cited

U.S. PATENT DOCUMENTS 9,158,395 B2 *   10/2015   Park ...................... G06F 3/0227
2004/0117853 A1   6/2004   Karaoguz et al.
(Continued)

FOREIGN PATENT DOCUMENTS

WO    WO 2011/075825 A1    6/2011
WO    WO 2012/112896 A2    8/2012

OTHER PUBLICATIONS

John Ritchie and Thomas Kuehnel, "UPnP AV Architecture:1", 2000-2002, Contributing Members of the UPnP Forum, pp. 1-22.*
(Continued)

*Primary Examiner* — Chau Nguyen
(74) *Attorney, Agent, or Firm* — Squire Patent Boggs (US) LLP

(57) ABSTRACT

The present invention relates to a system that comprises a rendering server, a rendering device, and a control device. The control device and the rendering device comprise a browser. The browsers are used to establish a first web link between the control device and the rendering server, and a second web link between the rendering device and the rendering server. The rendering device may connect to the rendering server over the second web link to register to the rendering server and pair with the control device. The control device may connect to the rendering server over the first web link to register and pair with available rendering devices that would be used for rendering content. During operation the control device may control information identifying the rendering device and a content data item for rendering over the first web link to the rendering server. The rendering server may generate, in response to the first control information, second control information that includes rendering control commands for rendering the identified content data item, and send it to the identified rendering device over the second web link. The rendering device renders the content data item according to the rendering control commands received from the rendering server.

10 Claims, 5 Drawing Sheets

(51) Int. Cl.
*H04N 21/436* (2011.01)
*H04L 12/28* (2006.01)
*H04N 21/61* (2011.01)
*H04L 29/06* (2006.01)
*H04L 29/08* (2006.01)

(52) U.S. Cl.
CPC .......... *H04L65/4084* (2013.01); *H04L 67/025* (2013.01); *H04N 21/436* (2013.01); *H04N 21/6175* (2013.01); *H04L 67/16* (2013.01)

(56) References Cited

U.S. PATENT DOCUMENTS

| | | | |
|---|---|---|---|
| 2005/0138137 A1* | 6/2005 | Encarnacion et al. | 709/217 |
| 2007/0157234 A1* | 7/2007 | Walker | 725/38 |
| 2007/0288470 A1* | 12/2007 | Kauniskangas | H04L 12/2809 |
| 2008/0133759 A1* | 6/2008 | Weel | 709/227 |
| 2009/0106414 A1* | 4/2009 | Stavenow et al. | 709/224 |
| 2009/0172780 A1 | 7/2009 | Sukeda et al. | |
| 2010/0121942 A1 | 5/2010 | Ooi et al. | |
| 2010/0332565 A1* | 12/2010 | Al-Shaykh | G06F 17/30905 707/912 |
| 2011/0197236 A1* | 8/2011 | Rao | 725/74 |
| 2011/0295972 A1* | 12/2011 | Nagatomo | 709/217 |
| 2012/0005311 A1* | 1/2012 | Livingston et al. | 709/219 |
| 2012/0299811 A1* | 11/2012 | Amendolagine et al. | 345/156 |

OTHER PUBLICATIONS

Samant Rae and Arvind Kumar, "Home Networking and Digital Living Networking Alliance", TaTa Consultancy Services, Copyright © 2008 Tata Consultancy Services Limited, pp. 14.*

Chih-Lin Hu, Wei-Shun Liao and Yen-Ju Huang, "Mobile Media Content Sharing in UPnP-Based Home Network Environment", 2008, Journal of Information Science and Engineering 24, pp. 17.*

International Preliminary Report on Patentability dated Feb. 26, 2014 corresponding to International Patent Application No. PCT/FI2013/050016.

International Search Report dated Mar. 25, 2013 corresponding to International Patent Application No. PCT/FI2013/050016.

Finnish Search Report dated Nov. 22, 2012 corresponding to Finnish Patent Application No. 20125024.

Supplementary European Search Report dated Sep. 10, 2015 corresponding to European Patent Application No. 13736437.

Anonymous: "Remote streaming—SqueezeboxWiki," Apr. 24, 2011, pp. 1-2, XP055212425. Retrieved from Internet: http://wiki.slimdevices.com/index.php/Remote_streaming.

Anonymous: "SlimProto TCP protocol—SqueezeboxWiki," Apr. 13, 2011, pp. 1-9, XP055212431. Retrieved from Internet: http://wiki.slimdevices.com/index.php?title=Slimproto_TCP_protocol&oldid=12233.

"Getting to know Logitech Squeezebox Touch Wi-Fi Music Player Features Guide Contents," May 7, 2010, pp. 1-31, XP055212507. Retrieved from Internet: http://www.logitech.com/assets/30072/documentation.pdf.

Anonymous: "Connecting remotely—SqueezeboxWiki," May 24, 2011, pp. 1-3, XP055212514. Retrieved from Internet: http://wiki.slimdevices.com/index.php/Connecting-remotely.

* cited by examiner

RENDERING SYSTEM

FIELD OF THE INVENTION

The present invention relates to media rendering and especially to a rendering system, rendering methods and a computer program product as defined in the preambles of the independent claims.

BACKGROUND ART

Consumers are acquiring, viewing, and managing an increasing amount of digital media in the Computer Electronics (CE), mobile, and Personal Computer (PC) domains. Enjoyment of this digital media, regardless of the source, is becoming increasingly important in the home. To this end, the Universal Plug and Play (UPnP), the Digital Network Alliance standardization (DLNA) and other standardization groups are working to provide interoperable, home networked devices that provide new value propositions and opportunities for consumers and product vendors to allow controlling and rendering between devices located in the same proximity network.

Today, there generally exists three categories of technology that serve the consumer in his or her home. First, there is the PC category that allows each consumer to interact with each other and other peripherals via the Internet. Second, there is the broadcast category that serves set-top boxes and other traditional consumer electronics, such as satellite television (TV) receivers, broadcast tuners, video and imaging capture devices, etc. Third, there is the mobile category, consisting of for example, multimedia mobile phones, Personal Digital Assistants (PDAs), laptop computers and similar devices that provide connectivity and freedom of movement into and out of the home environment, while operating within their own mobile network. UPnP specifications define protocols for communication between control points and controlled devices, and DLNA defines how these protocols are applied in DLNA certified device classes and device configurations. Device manufacturers can choose to implement any combination of DLNA components to their products, and this means that digital homes can soon contain a wide variety of devices that store access and play different forms of digital media with device control intelligence distributed around the home network. For example, a three-box DLNA configuration includes a Digital Media Server (DMS), a Digital Media Renderer (DMR) and a Digital Media Controller (DMC). DMS stores content and makes it available to DMRs. DMC finds content from DMSs and pushes it to DMRs. With this configuration, a notebook computer can be configured to act as DMC and find pictures and video from different devices that incorporate a DMS and therefore act as digital media storages in the home network. The user may then use the notebook to bring the videos and pictures up on DLNA-capable television sets and picture frames (DMRs) in various locations in the home.

Even if significant progress has been made in the field of rendering systems, some disadvantages still exist. DLNA establishes guidelines according to which DLNA certified products can work together over a wireless or wired home network. When the home network is set up, certified devices can easily connect, discover and communicate with each other over it. However, many consumers still consider setting up and managing a home network, and configuring UPnP roles of their various existing devices a highly complicated task. This is especially true if different UPnP elements need to be designed to connect to the home network via subnetworks that apply different wireless and wired transmission methods. On the other hand, many technologically advanced consumers consider reliance to specific industry standards limiting and would prefer as simple and robust solutions as possible.

SUMMARY

The object of the present invention is to provide a method and apparatus so as to overcome, or to alleviate at least one of the prior art disadvantages. The objects of the present invention are achieved with a system according to the characterizing portion of claim 1. The objects of the present invention are further achieved with a method and a computer program product according to the characterizing portions of the other independent claims.

The preferred embodiments of the invention are disclosed in the dependent claims.

The present invention is based on web based rendering, by means of which the need for home network connection between a control point and a media renderer is eliminated. The control device, the rendering server and the rendering device are configured to comprise a browser and a connection manager by means of which the respective elements are configured to access each other according to a predefined scheme. In the predefined scheme, two separate web links are established by means of given (pre-installed or user given) web addresses. The term web link refers here to a communication path between two endpoints, where at least one endpoint can access the other endpoint by means of a web address of the other endpoint. The term web address refers here to a globally unique network address that distinguishes an entity from other entities on the Internet. The control operations that have conventionally been implemented by a locally linked UPnP control point are now divided to a control device and a rendering server. These entities exchange information via a first web link. The control device may be a simple device associated with a specific user. It provides a user interface for outputting information received via the first web link and for inputting user commands to be delivered to the rendering server via the first web link. The first web link is established by configuring the control device to apply the web address of the rendering server.

The rendering server may be an external network server or it may be located in the same home network as the control device. In either case the rendering server is configured to source media content from various media resources and communicate with various control and rendering devices. The rendering server comprises necessary procedures to translate and process user information it receives from the control device via the first web link to rendering control commands that it provides to a rendering device via a second web link. In order to do this, a second web link is established between the rendering server and a rendering device by configuring the rendering device to apply the web address of the rendering server.

A connection manager in a rendering device may be configured to activate the second web link according to a predefined web link scheme and this way ensure that the second web link is operational, meaning that information may be delivered in both ways. The rendering server maintains information on available media content, and information on rendering devices that have an operational web link to the rendering server. It makes this information selectively available to the control device over the first communication link, and the control device allows a user to select a content item to be rendered, and a rendering device for rendering. The control device forwards information corresponding to the user selection over the first web link to the rendering server. The rendering server in turn generates corresponding rendering control commands and provides them over the second web link to the rendering device.

From the point of view of the user, the proposed system can thus be made very simple and easy to use, because the user does not necessarily need to configure or maintain a control point in the home network, all he or she has to do is activate a defined web address to a browser of a rendering device or a control devices he or she uses. The proposed system is also very reliable, because it does not have to rely on operability of a home network; simple Web access is only needed in the used control and rendering devices. In the simplest configuration the user may practically rely on control and operability of a professionally maintained external rendering server that his or her devices access via a browser-based connection.

Since the first and second web links are separate, the control device and the rendering device do not have to be in the same home network. This means that they may also be operated in completely different locations. This facilitates a very simple and straightforward solution for remote controlling of home devices.

Due to use of explicit web links, the control logic and procedures of the rendering server may be located also outside autonomic zones of home networks. This allows provision of a rendering server that sources content from a cloud of interconnected media servers, and thereby significantly broadens the selection of content items potentially available to the user. Also any complexity related to sourcing and rendering control of content items may be entrusted to the care of an external service provider.

These and further advantages of the invention are discussed in more detail with the description of some embodiments given below.

BRIEF DESCRIPTION OF THE FIGURES

In the following, embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

Features of the invention will be described with simple examples of a system architecture in which various embodiments of the invention may be implemented. Only elements relevant for illustrating the embodiments are described in detail. Various implementations of the invented methods and devices comprise elements that are generally known to a person skilled in the art and may not be specifically described herein.

Figure 1:
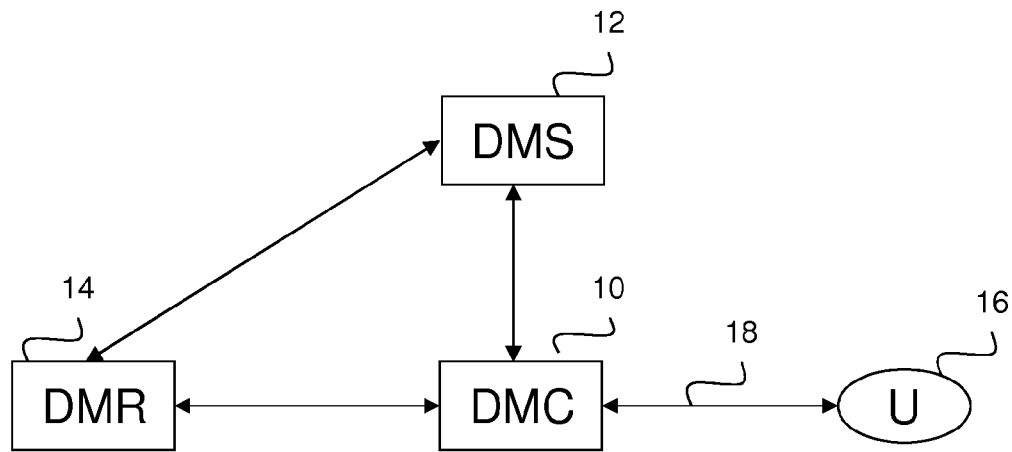
FIG. 1 illustrates elements and communication paths of an exemplary prior art rendering system.

FIG. 1 illustrates elements and communication paths of an exemplary prior art rendering system that applies UPnP and DLNA for media management discovery and control. A digital media server (DMS) 12 stores content and makes it available to networked digital media renderers (DMR) 14. Examples of DMS include personal computers and network-attached storage (NAS) devices. Digital media controller (DMC) 10 finds content on digital media servers (DMS) 12 and controls playing of it on digital media renderers (DMR) 14. Examples of DMC include Internet tablets, Wi-Fi enabled digital cameras and personal digital assistants (PDAs). Examples of DMR include TVs, audio/video receivers, video displays and remote speakers for music. DMC provides a user interface 18 through which it can prompt instructions from a user 16. The user interface 18 may be implemented as a device element in an apparatus incorporating DMC or as a combination of a mobile device of a user 16 and a control interface to the mobile device in the control point. The following generic description of operations in these prior art UPnP elements is extracted from Wikipedia, the free encyclopedia.

In UPnP networking each device implements a DHCP client and searches for a DHCP server when the device is first connected to the network. If no DHCP server is available, the device assigns itself an address via UPnP specified AutoIP procedure. The device may obtain a domain name during a DHCP transaction, for example, through a DNS server or via DNS forwarding.

UPnP elements discover each other with a Simple Service Discovery Protocol (SSDP). After a device is added to the network, it applies SSDP to advertise its services to control points on the network. Similarly, when a control point is added to the network, the control point may use SSDP to search for devices of interest on the network. An initial discovery message contains some essential specifics about the device or of its services, for example, its type, identifier, and a pointer to more detailed information.

After discovery of a device, the control point retrieves a device description from a resource location provided by the device in the initial discovery message. The UPnP description for a device is expressed in XML and includes vendor-specific manufacturer information like the model name and number, serial number, manufacturer name, URLs to vendor-specific web sites, etc. The description also includes a list of any embedded devices or services, as well as URLs for control, eventing, and presentation. For each service, the description includes a list of the commands, or actions, to which the service responds, and parameters, or arguments, for each action; the description for a service also includes a list of variables; these variables model the state of the service at run time, and are described in terms of their data type, range, and event characteristics.

When a description of the device is available, the control point can send actions to a device's service. To do this, a control point sends a suitable control message to the control URL for the service (provided in the device description). Control messages are expressed in XML using the IETF specified Simple Object Access Protocol (SOAP). Much like function calls, the service returns any action-specific values in response to the control message. The effects of the action, if any, are modeled by changes in the variables that describe the run-time state of the service.

An additional capability of UPnP networking is event notification, or eventing. The event notification protocol defined in the UPnP Device Architecture is known as General Event Notification Architecture (GENA). A UPnP description for a service includes a list of actions the service responds to and a list of variables that model the state of the service at run time. The service publishes updates when these variables change, and a control point may subscribe to receive this information. The service publishes updates by sending event messages. Event messages contain the names of one or more state variables and the current value of those variables. These messages are also expressed in XML. A special initial event message is sent when a control point first subscribes; this event message contains the names and values for all evented variables and allows the subscriber to initialize its model of the state of the service. To support scenarios with multiple control points, eventing is designed to keep all control points equally informed about the effects of any action. Therefore, all subscribers are sent all event messages, subscribers receive event messages for all "evented" variables that have changed, and event messages are sent no matter why the state variable changed (either in response to a requested action or because the state the service is modeling changed).

The final step in UPnP networking is presentation. If a device has a URL for presentation, then the control point can retrieve a page from this URL, load the page into a web browser, and depending on the capabilities of the page, allow a user to control the device and/or view device status. The degree to which each of these can be accomplished depends on the specific capabilities of the presentation page and device.

Figure 2:
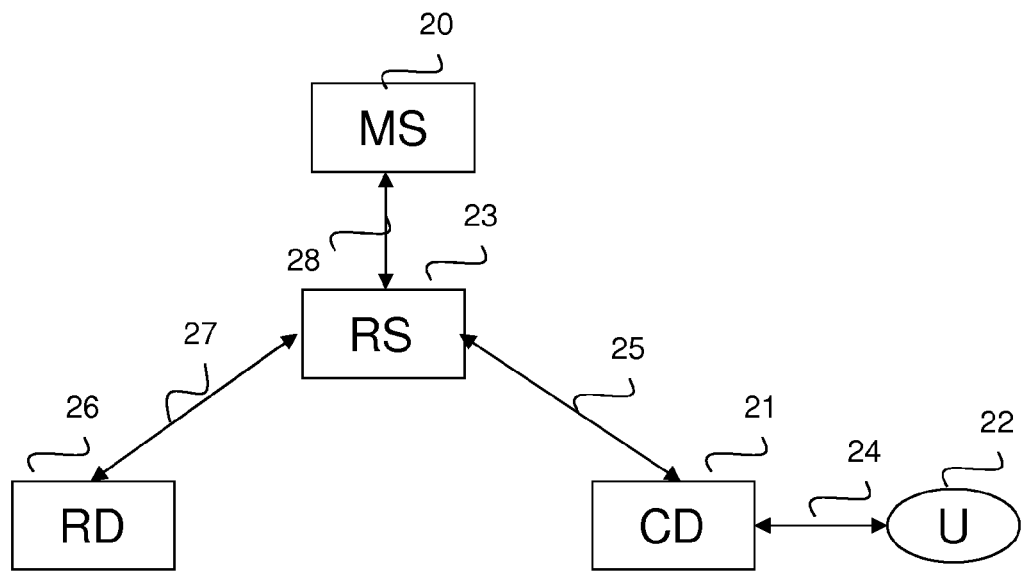
FIG. 2 illustrates elements and communication paths in an en embodiment of a rendering system according to the invention.

FIG. 2 illustrates elements and communication paths in an en embodiment of a rendering system according to the invention. The rendering system may be applied to content data of any digital media types, including, for example, to content items carrying audio, video, text, image, message, or application data. In interpretation of this text, the term browser refers generically to any entity that is able to input a web address and retrieve information from that web address. The web address may be input in a user command via a user interface of the device that incorporates the browser, or read from an internal memory or from an external data storage. The browser may be a Web browser, a software application that is used to locate, retrieve and also display content on the World Wide Web, including Web pages, images, video and other files. As a client/server model, the browser may act as the client run on a computer that contacts the web server in a specified web address and requests information. The web server sends the information back to the web browser, which displays the results on the computer or other Internet-enabled device in which the browser is embedded. The browser may also be some other native client application that is capable to interact with a server in a user given or otherwise accessible (e.g. stored in the client device memory) web address. The browser can also be a program element, for example a widget, integrated into a native application to provide a better user interface. Correspondingly, the term connection manager refers here to a functional entity of software and hardware elements that are incorporated into a system element of the disclosed rendering system. The connection manager sets up, opens and closes connections of the apparatus according to predefined processes that will be disclosed in detail in the following. The connection manager may be integrate into the same native application as the browser. It is noted that the following elements are logical entities. One physical device may incorporate elements and functions for one or more of these entities.

A media server (MS) 20 corresponds by far to the DMS in the prior art UPnP architecture. A media server operates as a content source and is accessible to one or more rendering servers. A media server may be, for example, a personal computer, a network attached storage device (NAS), a digital video recorder, a mobile telephone or a personal digital assistant, a media capture device, or any other network-enabled device that may incorporate an audiovisual server capability accessible from the rendering server.

A control device (CD) 21 is a system element that provides means for associating the control device with a user 22, means for exchanging information with the associated user and means for exchanging information with a rendering server (RS) 23. Association between a control device and a user means that the rendering server may be configured to exchange user information of a specific user by directing the exchanged messages to a web address of the control device 21. The term web address refers here to a globally unique network address that distinguishes the control device from other devices on the Internet. The control device may be a personal computing device of a user and provide automatic mechanisms for identifying the person using the control device, for example a subscriber identity module. Alternatively, the user may be identified and associated with the control device by means of identification or authentication information exchanged between the control device and the rendering server 23. In this case a user interface 24 of the control device may be used to output information requests received from the rendering server 23 to the user and input user information to be provided to the rendering server 23.

Accordingly, means for exchanging information with the associated user may be provided by the user interface 24 of the device that incorporates the control device 21. Exchange of information with a rendering server requires, in addition to the user interface, also a web link between the control device 21 and the rendering server 23. A first web link 25 between the control device 21 and the rendering server 23 is a web address based connection maintained by connection manager entities in both ends. During rendering operations of the rendering system, the control device is configured to provide to the rendering server first control information that identifies a rendering device and a content data item for rendering over the first web link. The first control information corresponds to a user selection made via the user interface of the control device.

As discussed above, one physical device may incorporate elements and functions for one or more of these entities. For example, a user terminal, like a mobile device, may operate as a control device through which the user provides rendering commands, and as a media server that acts as a content source towards the rendering server.

A rendering device (RD) 26 corresponds functionally to the conventional DMR, but comprises further a browser and a connection manager for setting up and maintaining a second web link 27 to the rendering server (RS) 23. During operation of the rendering system, the rendering device 26 is configured to render content data items according to the rendering control commands it receives from the rendering server 23. A rendering device may be a television system, a stereo system, a personal computer, a mobile telephone, a personal digital assistant, an image display frame, a game console, or any other network-enabled device, or a combination of them that may incorporate media rendering capability and a browser.

A rendering server (RS) 23 is a system element that interfaces media servers 20, control devices 21 and rendering devices 26. Content management discovery and control procedures 28 between the rendering server 23 and media servers 20 may be implemented using any conventional method, for example, applying specified UPnP procedures. The first and the second web links 25, 27 between the rendering server and the control device and the rendering device are browser-based web links, managed in the rendering server by a connection manager. The rendering server may also use web links 25, 27 to source content items from devices that operate as control and rendering devices. This means that the rendering server may be used as a cloud rendering server available to a plurality of control and network devices that may, but do not necessarily need to reside in the same home network.

In order to manage the potentially larger device populations, the rendering server advantageously comprises means for pairing a specific rendering device with a specific user and maintaining a user-specific record of rendering devices available to the user. The rendering server may also comprise means for associating the specific user with one or more content items and maintaining a user-specific record of these content items available to the user. The rendering server may also be configured to provide information extracted from these records to the user via the first web link. Due to the browser-based first and second web links between the rendering device 26 and the rendering server 23 none of the control device, the rendering server and the rendering device do not have to be located in the same home network, only Internet access between them is necessary. The advertisement schemes of conventional UPnP discovery processes for home networks may thus be replaced by defined web address based connection management procedures, as will be described later herein.

Figure 3:
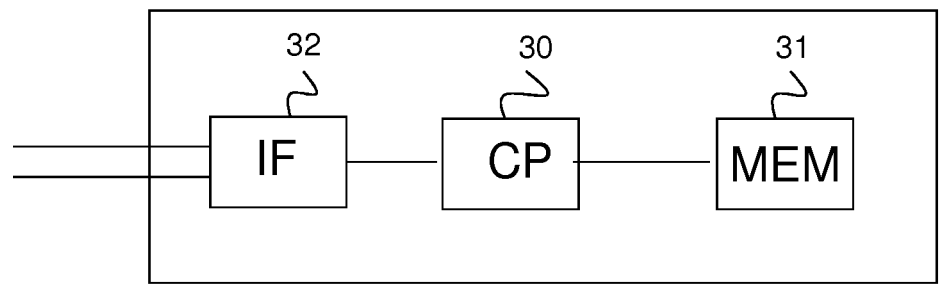
FIG. 3 shows a block diagram illustrating configuration of an exemplary system element apparatus.

Embodiments of this invention comprise an apparatus, applicable as a system element of the disclosed rendering system. The apparatus provides means for implementing the above mentioned means and functions. FIG. 3 shows a block diagram illustrating configuration of an exemplary apparatus for the purpose. It is noted that any type of user terminals may be applied without deviating from the scope of protection.

The apparatus comprises a processor unit 30 for performing systematic execution of operations upon data. The processor unit 30 is an element that essentially comprises one or more arithmetic logic units, a number of special registers and control circuits. Memory unit 31 provides a data medium where computer-readable data or programs, or user data can be stored. The memory unit is connected to the processor unit 30. The memory unit 31 typically comprises volatile or non-volatile memory, for example EEPROM, ROM, PROM, RAM, DRAM, SRAM, firmware, programmable logic, etc. The apparatus also comprises an interface unit 32 with at least one input unit for inputting data to the internal processes of the apparatus and at least one output unit for outputting data from the internal processes of the apparatus.

The interface unit comprises elements for network connectivity. If a line interface is applied, the interface unit 32 typically comprises plug-in units acting as a gateway for information delivered to its external connection points and for information fed to the lines connected to its external connection points. If a radio interface is applied, the interface unit 32 typically comprises a radio transceiver unit, which includes a transmitter and a receiver, and is also electrically connected to the processing unit 30. The transmitter of the radio transceiver unit receives a bitstream from the processing unit 30, and converts it to a radio signal for transmission by the antenna. Correspondingly, radio signals received by the antenna are led to the receiver of the radio transceiver unit, which converts the radio signal into a bitstream that is forwarded for further processing to the processing unit 30. Different radio interfaces may be implemented with one radio transceiver unit, or separate radio transceiver units may be provided for the different radio interfaces.

The interface unit 32 of the apparatus may also comprise a user interface with a keypad, a touch screen, a microphone, and equals for inputting data and a screen, a touch screen, a loudspeaker, and equals for outputting data. The processor unit 30, the memory unit 31, and the interface unit 32 are electrically interconnected to perform systematic execution of operations on received and/or stored data according to predefined, essentially programmed processes of the apparatus. These operations comprise the means, functions and procedures described herein for the rendering server, control device and rendering device.

In general, various embodiments of the apparatus may be implemented in hardware or special purpose circuits, software, logic or any combination thereof. Some aspects may be implemented in hardware, while some other aspects may be implemented in firmware or software, which may be executed by a controller, microprocessor or other computing device. Software routines, which are also called as program products, are articles of manufacture and can be stored in any apparatus-readable data storage medium and they include program instructions to perform particular tasks. The exemplary embodiments of this invention also provide a computer program product, readable by a computer and encoding instructions for executing a rendering method in the apparatus of FIG. 3.

While various aspects of the invention may be illustrated and described as block diagrams, message flow diagrams, flow charts and logic flow diagrams, or using some other pictorial representation, it is well understood that the illustrated units, blocks, apparatus, system elements, procedures and methods may be implemented in, for example, hardware, software, firmware, special purpose circuits or logic, a computing device or some combination thereof.

Figure 4:
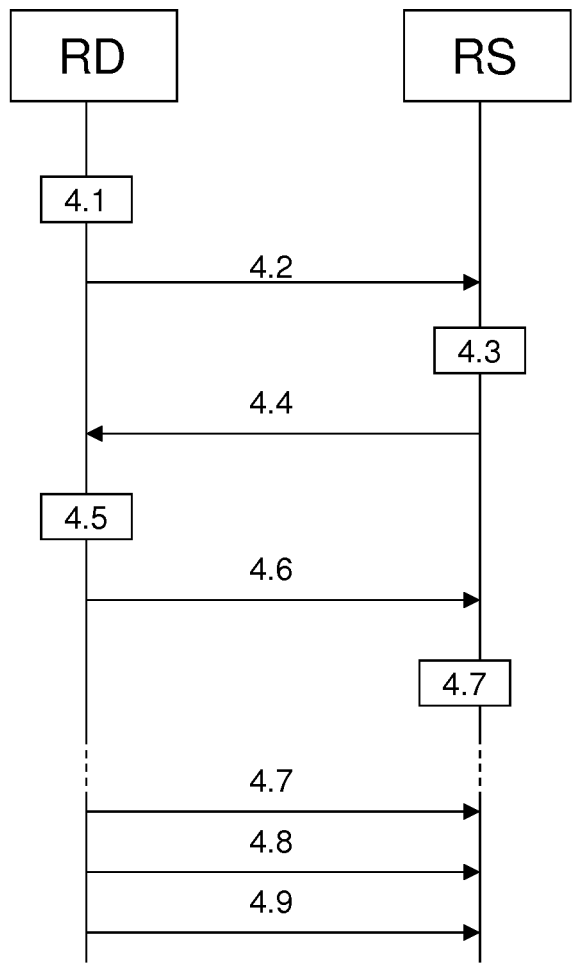
FIG. 4 illustrates functions and exchange of information applied for discovering a rendering device.

As discussed above, when a UPnP device is added to a network, it multicasts discovery messages to a standard address and port (239.255.255.250:1900). The address is in the range of addresses that contains limited scope addresses or administratively scoped addresses. These are defined by RFC 2365 to be constrained to a local group or organization. Routers are typically configured with filters to prevent multicast traffic in this address range from flowing outside an autonomous system (AS) or any user-defined domain. Due to this the device advertisement and multicasting based UPnP discovery procedures of DLNA compatible devices are not directly applicable when one rendering server should be scalable to a larger device population than devices of one home network or other autonomous network. FIG. 4 illustrates functions and exchange of information applied for discovering a rendering device in an embodiment of the rendering system according to the invention. The procedure begins in a stage where both the rendering server RS and the rendering device RD are operational and provided with web access. In the beginning the rendering device is triggered (step 4.1) to announce its services to a rendering server. The rendering device may be triggered to announce its services as soon as it is switched on and the IP connectivity has been created. Alternatively, the user of the rendering device may be provided with a hardware or software button by means of which he or she may at will trigger announcement of availability to the rendering server. Also other triggering methods may be applied within the scope of protection.

The triggered rendering device creates a service announcement and provides it to the rendering server (step 4.2). The service announcement comprises one or more service announcement messages delivered from the rendering device to the rendering server and may be formatted according to SSDP or XML data push specifications. The rendering device may, for example, be provided a pre-installed web address of the rendering server in its connection manager. However, the rendering device does not necessarily need any prior knowledge about the rendering server, the user may input a given web address of the rendering server to be browser through the user interface of the rendering device.

In its simplest form the service announcement indicates the ability of the rendering device to render content data items. When the rendering server receives the initial service announcement it registers the rendering device (step 4.3) to its record of available devices and initiates negotiation about connection parameters to be applied in the second web link. In the absence of home network multicast messages, the second web link may be maintained by periodic keep alive messages transmitted from the rendering device to the rendering server. If the rendering device fails to send the keep alive message within the negotiated period, the rendering server may consider the rendering device unavailable and delete it from the register of available rendering devices. In a simple procedure the rendering server may generate a response including a defined period for keep alive messages and send it (step 4.5) as an acknowledgement to the rendering device. The connection manager of the rendering device may take this period into use and acknowledge its availability by sending the first keep alive message (step 4.6) to the rendering server. After this, the rendering server may consider the rendering device available for service and consider the registration complete (step 4.7). The rendering device may then continue sending keep alive messages (steps 4.8, 4.9, 4.10) according to the negotiated periodic scheme.

Advantageously the service announcement provides also other connection or device related information on the rendering device. For example, the service announcement may detail media types (e.g. video in MPEG2 or MPEG4 format or Windows Media Audio (WMA) or Video (WMV) formats, flash video) supported in the rendering device. Advantageously the rendering device is also configured to include in the service announcement a friendly name that enables its recognition of the rendering device by users at a later stage. If the rendering device has a user interface, the connection manager may be configured to prompt the user of the rendering device to input such a name. As another example, the friendly name may be a serial number or some other character string that is visibly printed in the rendering device casing.

In this case the connection manager may be configured to automatically provide the user-friendly name to the rendering server in one of the service announcement messages. In case the rendering device do not have a user interface, or the interaction with the user for entering the friendly name in the rendering device is too difficult, the friendly name may be entered in the control device when the devices are associated, as will be described later on.

The periodic scheme is advantageously adjusted according to the rendering state of the rendering device. This means that when the rendering device is only standby for use, the keep alive messages may be transmitted with longer intervals. In other states, an adjusted interval may be applied. This aspect of connection management will be discussed in more detail later on.

Figure 5:
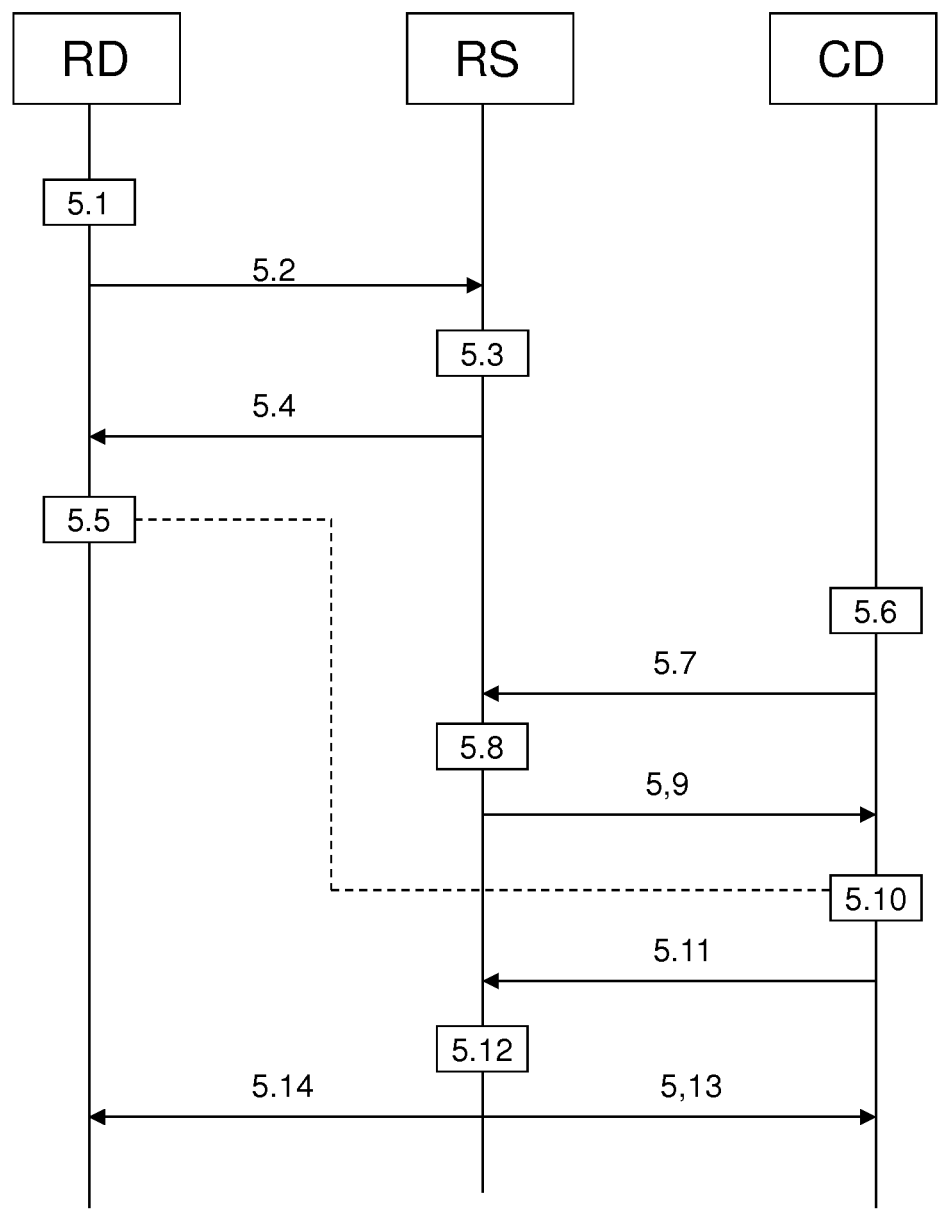
FIG. 5 illustrates functions and exchange of information applied for associating a rendering device with a user.

In a rendering server designed to serve larger device populations, it is not practical to announce each rendering device registered to the rendering server to each user. A user may therefore be associated with a rendering device, and only information on rendering devices associated to the user may be offered to the user for selection. FIG. 5 illustrates exemplary functions and exchange of information applied for associating a rendering device with a user in an embodiment of the rendering system according to the invention.

The procedure begins in a stage where the rendering device RD, the rendering server RS and the control device CD are switched on and provided with IP connectivity. In the beginning the rendering device detects a trigger (step 5.1) for requesting pairing of the rendering device to a control device of a user. The trigger may be activated immediately after the rendering device has registered to the rendering server via the first web link. Pairing may be triggered also later on by, for example, a user activating a widget in the user interface of the rendering device. A pairing request is generated in the rendering device, and the rendering device delivers the request (step 5.2) to the rendering server. The rendering server generates a random character string (step 5.3), for example a pin code, and responds to the pairing request (step 5.4) with a request to display this character string to the rendering device (step 5.5).

In the control device end the user may trigger pairing by providing a corresponding request via the user interface (step 5.6) to be delivered (step 5.7) to the rendering server via the second web link. The request may be given, for example, by the user inputting a specific web address of the rendering server to his browser. As another example, the request may be given automatically by a browser-based native application in the rendering device which has been preconfigured with the web address of the rendering server. In order to trigger pairing, the user only has to install and run the browser-based native application. The rendering server may be configured to respond (step 5.8) to the browser request by returning (step 5.9) to the control device a web page with a field to type in a pin of a rendering device the user wishes to be associated with. The control device displays this web page and the user may input the character string displayed in the rendering device to the given field. In the other case, the browser-based native application in the control device may offer a pop up window where user may type the pin of the rendering device that user wishes to associate with. The control device provides the character string to the rendering server (step 5.11) that checks whether the strings match and in the positive case, associates the rendering device with the user (step 5.12). The rendering server may acknowledge the successful pairing to the control device and the rendering device (steps 5.13 and 5.14).

The disclosed procedure enables the rendering server to associate a rendering device to a user and at the same time confirm that the associated user and the rendering device are near to each other. In this way malicious external control attempts may be eliminated in a very simple manner. The same procedure may be applied every time the rendering device is used, or only when the first association is made. It is noted that the above procedure is, however, only one example of creating the association. For example, the rendering server may alternatively identify a user by a username and the rendering device may be configured to prompt the user to input his or her username via the user interface of the rendering device. The rendering server may also be configured to associate a user to rendering devices whose web address is in the same address space as the web address of the control device of the user. Also other mechanisms may be applied without deviating from the scope of protection.

As discussed above, the rendering server is connected to one or more media servers in one or more home networks, other autonomous networks, in the Internet to find content elements and to control their rendering in the rendering devices. The rendering server may be configured to poll, search and index content from various sources and provide controlled access to this cloud of media servers. The rendering server may provide all content items in its cloud to all users subscribing a cloud content service of the rendering server. For example, a rendering server may be configured to record broadcast programs of a plurality of broadcasting channels and provide the full selection of these content items similarly to all users subscribing the service. However, in several applications, also content items provided to the user may also be selectively associated to the user, and only associated content items may be provided to the control device for user selection. Several methods are available for the selective association. The rendering server may use information received with service announcements to perform content adaptation and transcoding to the content item to ensure that the selected rendering device is capable of rendering the content indicated by the control device.

Let us assume that a user identity is created for a user when he subscribes to a cloud content service provided by the rendering server. The rendering server may be configured to request the user to authenticate his or her identity when the rendering server is accessed from the control device with a user request. The user identity may be authenticated by offering a web page or a pop up, to which the user may input a pin code or a username and a password. As another example, the rendering server may be configured to associate the user identity with content items selected for rendering by the user. As a further example, the rendering server may be configured to associate the user identity with a content item available in a rendering device associated with the user or a control device of the user. As a further example, the rendering server may record available metadata from content items selected for rendering by the user and use this metadata as a criteria to search similar content data items from the cloud media servers. As a further example, the rendering server may record metadata from content items selected for rendering by another user and use this metadata as a criteria to search similar content data items from the cloud of media servers for the user. As a further example, the rendering server may store content items received from media servers and act as a media source for the selected rendering device or store links that enable access to a media source in the cloud of media servers. These methods may be applied alone or in combination. Also other methods for associating the user to content items may be applied without deviating from the scope of protection.

Figure 6:
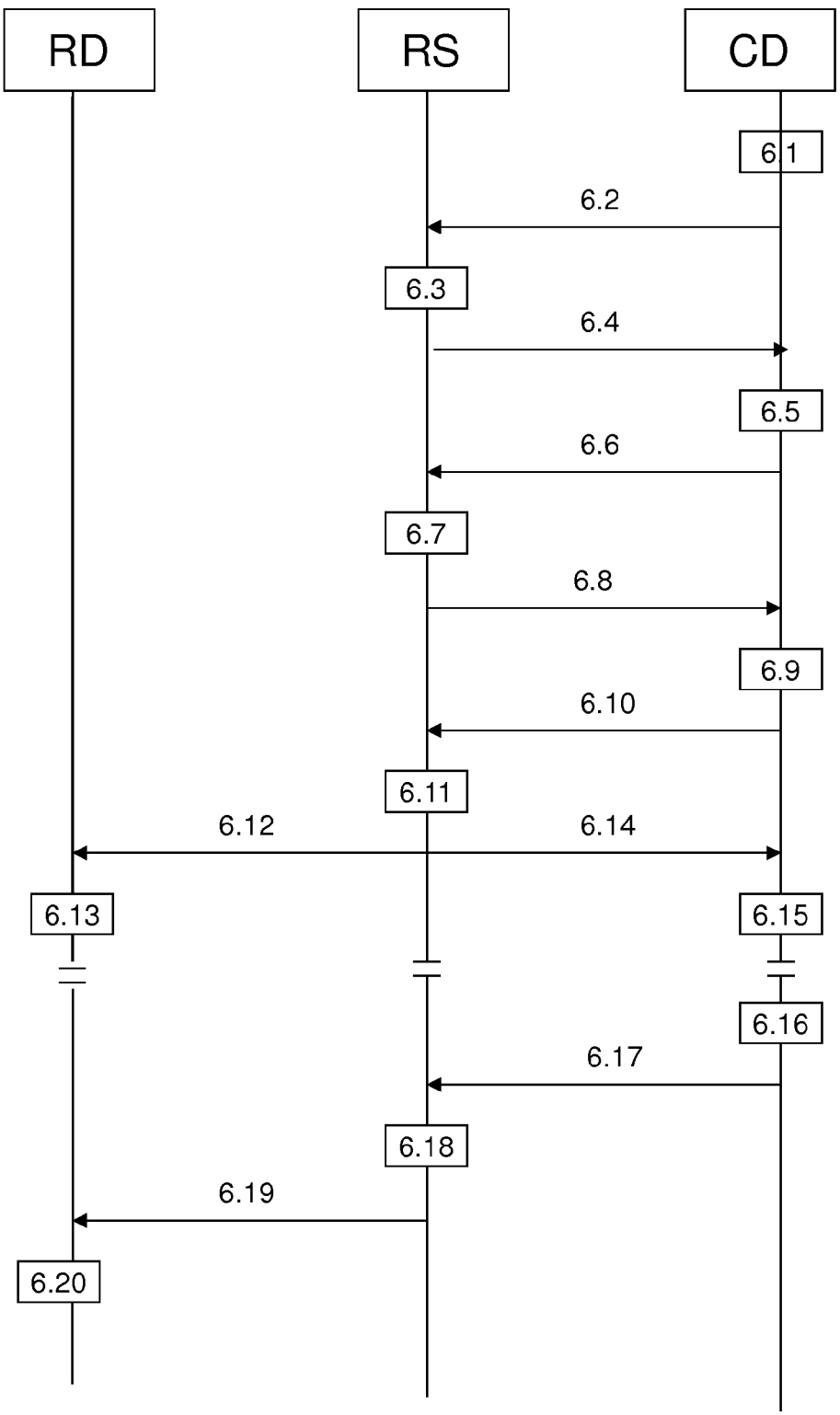
FIG. 6 illustrates functions and exchange of information during a rendering session of a user.

During operation of the rendering system, the control device is configured to use the first web link to send to the rendering server first control information that identifies a rendering device and provide a content data item directly or indirectly for rendering. Advantageously the rendering device and the content data item are selected from a group of rendering devices and content data items associated with the user in the rendering server. FIG. 6 illustrates functions and exchange of information during a rendering session of a user in an embodiment of the rendering system according to the invention. it is noted that for understanding of the operation of the rendering system, FIGS. 4, 5 and 6 may be referred to in combination.

The procedure begins in a stage where the rendering device RD has been registered to the rendering server RS and the rendering device and the user of the control device CD have been associated with each other. Accordingly, the rendering server comprises a first data record of rendering devices available to the user, and this record comprises the rendering device RD. In addition, the rendering server comprises a second data record that lists content data items made accessible to the user via it. The first data record and the second data record may be maintained separately or form a combined user-specific data record.

The procedure is initiated when the control device receives (step 6.1) through its user interface a command to start rendering content data items. This may be implemented by the user opening the browser or using a browser-based native application and inputting a network address that includes the web address of the rendering server to the browser. This web address based communication path provides the first web link that exists between the control device and rendering server. The web address may be URI, IP address or hostname, and it may be typed in the browser by the user or it may be preconfigured for selection in the control device. The browser request is delivered to the rendering server (step 6.2) and in response to it, the rendering server identifies the user and compiles a web page that displays an index of content data items available to the user (step 6.3) and prompts the user to select a content item for rendering. This web page is delivered to the control device (step 6.4), which displays it to the user and receives the user's selection via the user interface (step 6.5) of the control device.

The user selection is delivered to the rendering server (step 6.6) that compiles device information for displaying registered rendering devices paired with the user and for prompting the user to select a rendering device for rendering. Advantageously this device information includes the friendly names that the user or other users have given to the rendering devices during their registration to the rendering server. This device information is provided to the control device (step 6.8) as a web page or, if a browser-based native application is used, as a pop up window displayed to the user. The control device displays the device information and receives the user's selection via the user interface (step 6.9). The user selection is again delivered to the rendering server (step 6.10) that now activates the rendering device (step 6.11). According to the communication scheme of the second web link, the activation message may be provided as a response to the next keep alive message of the rendering device. The rendering server may reply by providing (step 6.12) to the rendering device control activation information that includes rendering control commands for rendering the user selected content data item. If the content item is stored in the rendering server or otherwise accessible to it, it may provide the content item with the control information to the rendering device. The rendering server may also provide the rendering device with a link to a resource from which the content data item may be retrieved. When the content item is accessible to the rendering device, rendering may begin immediately.

The rendering server may also acknowledge initiation of rendering to the control device (step 6.14). This may be provided as a web page or pop-up that is updated according to status information from the rendering server, and provided to the user to prompt for further control commands for the rendering session. For example, the user may be provided with control keys to fast forward or rewind the content, control voice level, stop, pause and restart rendering etc. If such user selection is received (step 6.16) in the control device it is delivered to the rendering server (step 6.17). The rendering server generates a corresponding rendering control command (6.18) and sends it to the rendering device (step 6.19) that may adjust its rendering according to the provided commands (step 6.20).

As discussed above, the interval between keep alive messages of a rendering device in standby mode may typically be between 5 to 10 minutes. However, at step 6.7 when the rendering server compiles the list of rendering devices available to the user, it may also send to these rendering devices a command to considerably decrease the interval between the keep alive messages in the second web link, to 30 seconds or even less. Correspondingly, when the rendering server activates the rendering device in step 6.12, it may command the selected rendering device to further decrease the interval, for example to the order of 2 or 3 seconds or even less to ensure prompt reaction of the rendering device to the control commands. The non-selected associated rendering devices may at this stage be commanded back to the normal standby schedule of keep alive messages. This arrangement facilitates good response times when the rendering device needs to be active and at the same time eliminates unnecessary exchange of information during standby operation of the rendering device.

The connection managers of the second web link may also be configured to open two or more connections using different transfer technologies between the rendering server and the rendering device. The connection managers in the rendering device and/or the rendering server may be configured to setup and test the different connections. A connection with minimum RTT may be selected for exchange of information over the second web link during rendering. If one connection is dropped, the connection managers of the second web link may be configured to activate another connection to replace the dropped connection.

In order to manage inflow of rendering control commands from various connections of the second web link, the rendering server may be configured to include to the rendering control command messages (e.g. steps 6.12, and 6.19) a sequence number, and the rendering device may use this sequence number to discard duplicate messages. The starting sequence number corresponds to one user control request received from the control device and may be selected randomly, and be incremented sequentially. For example, a sequence of control messages may comprise:

3422-PLAY-URI=http://X.X.X.X/media.mp4
3423-VOLUMEUP-URI=http://X.X.X.X/media.mp4
3424-PAUSE-URI=http://X.X.X.X/media.mp4
3425-TEARDOWN-URI=http://X.X.X.X/media.mp4

It is noted that the proposed concept is applicable even in simple rendering devices with very restricted user interface and processing capability, as long as a browser is available. For example, a user may type the web address pointing to the cloud rendering server (e.g. https://renderbooxtv.com or https://play.booxtv.com) and the client may be provided with a web page for authentication and entering the user-friendly name of the rendering device. Authentication may be made by the user typing in a pin code or username and password provided to him at service registration. As another example, the three-box authentication scheme described in FIG. 5 may be applied. The rendering server may request the user to type a pin code that is displayed in the rendering device to the control device, or to type a pin code that is displayed in the control device to the rendering device. The connection manager may comprise a javascript or some other similar script run in the rendering server to periodically connect to the rendering server and check if the server returns a web page that automatically triggers the playback of the content item when received in the rendering device. For example, in response to a user request from a control device, the rendering server may create a HTML5 or other HTML, XHTML, XML, or similar page that can be interpreted by browser or browser-based native application and includes the media item that the user has selected for playback. When the rendering device retrieves the generated page it will automatically start the rendering without requiring any further logic or processing of its own.

In the minimum, continuous standby state, even a slow one, for two-way communication is only needed in the second web link. The control device may, however, be also configured with a connection manager that activates the first web link regularly according to a predefined scheme.

The connection manager of the rendering device or the control device (hereinafter: user device) may also be configured to send content update information to the rendering server. This content update information may comprise information on content data items rendered by the user, to help the rendering server to source and select similar content items for the user. This content update information may also or alternatively comprise information on content data items stored to the user device apparatus from another source than the rendering server. Such information can be, for example, images taken with a camera integrated to a control device or television programs recorded from broadcast channels in the rendering device. The content update information may comprise identification information that identifies the content item in the user device and/or the content item itself. Advantageously a user-friendly name or metadata is provided for the content item.

The connection manager of a user device may be configured to send content update information on all of its content items, or only information on new or changed content items. If a two-way connection is available, connection manager of the rendering server many be configured to send a content update information request and user device may be configured to respond to it.

Figure 7:
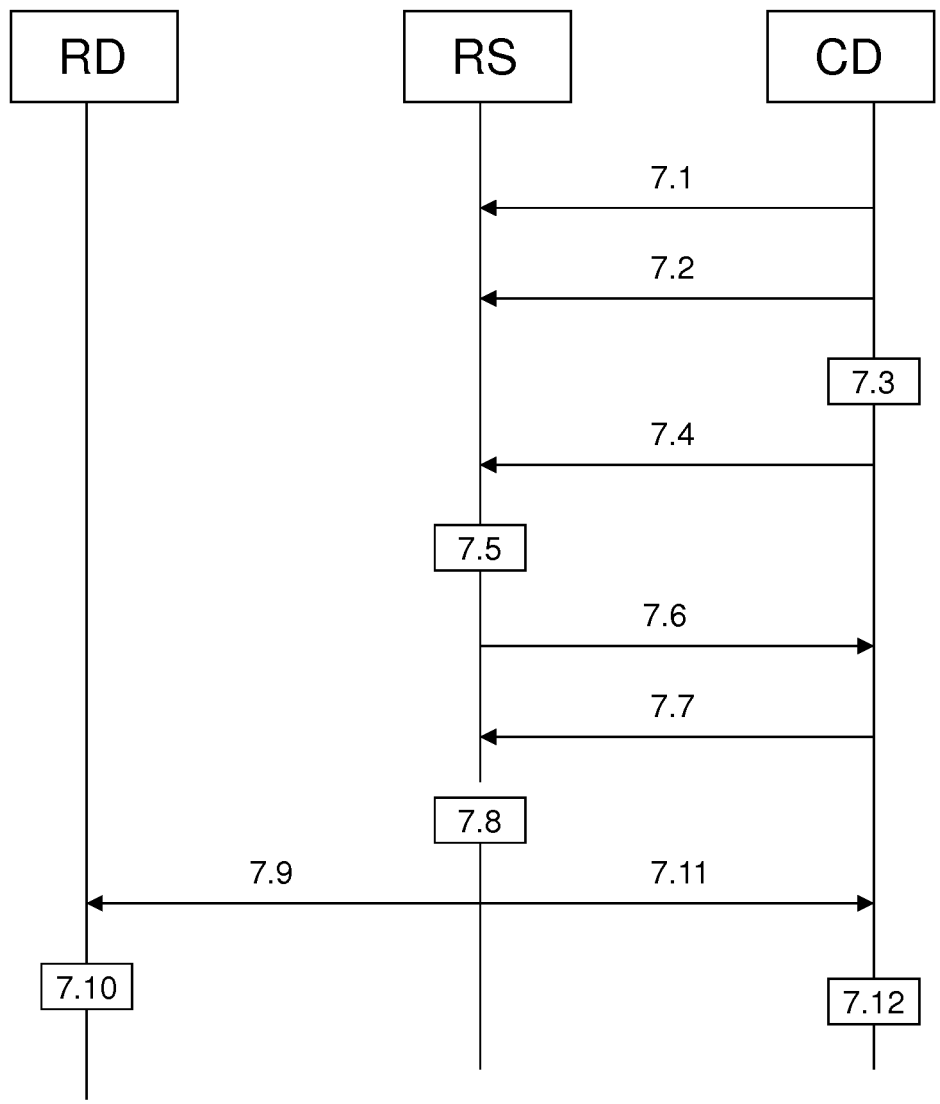
FIG. 7 illustrates a further embodiment of the rendering system.

As a simple use case of the above arrangement, FIG. 7 illustrates a further embodiment of the rendering system of the invention. The embodiment relates to an exemplary situation where the user has stored a content item into the device he uses as a control device. For example, let us assume that the content item comprises a tune (digital audio file), the control device is a mobile device of the user, and the rendering device is a stereo player available to the user. The procedure begins at a stage where the control device CD, the rendering server RS and the rendering device RD are operable and the rendering device is already associated with the user of the control device according to the procedures described earlier.

Let us assume that the connection manager of the control device is configured to send to the rendering server content update information 7.1 and 7.2 at regular intervals. At least one of these updates includes record information that details the tune in the user's mobile device. This record information may comprise, for example, the name of the artist and the name of the piece of music. The rendering session starts when the user selects the content item for rendering. For example, mobile devices typically allow a user to browser though a list of tunes stored in the mobile device. Here the browser-based application accesses the same information and allows the user to select the tune from the list. Instead of directing the tune to the limited loudspeakers of the mobile device, wants to listen it from a quality stereo available to him, so the control device generates (step 7.3) a rendering request and sends (step 7.4) it to the rendering server. The rendering request may comprise record information on the content item and a confirmation that the content item is available in the control device. It may also comprise information that identifies the rendering device the user wants to use. Advantageously user is allowed to select the rendering device from a list of friendly names of rendering devices associated with him. The list may be stored in the control device or the rendering server may send a list of available rendering devices which have been previously paired with the control device. Other methods for identify the content item and the rendering server may be used within the scope of protection.

When the rendering server detects the request (step 7.5) it generates an upload request (step 7.6) to the control device and the control device automatically, replies by delivering the content item to the rendering server (step 7.7). The rendering server processes the rendering request of the control device to a set of rendering control commands (step 7.8) and sends an activation message (step 7.9) to the rendering device. The rendering device, which is already connected to the rendering server via the second web link and has been previously paired with the control device, may then immediately and without further actions from the user's part start rendering (7.10) the content item. The rendering server may also acknowledge the rendering session to the control device by providing a web page of pop-up (step 7.11) that allows the user to control (7.12) the rendering session (i.e. pause, stop, resume, fast forward, etc.), as described in connection with FIG. 6. This example illustrates that by means of the arrangements proposed herein, the user can basically without any understanding on the underlying network infrastructures control rendering of content items to and in almost any rendering device with a simple terminal device available to him or her.

It is noted that the disclosed new procedures in the rendering server, the control device and the rendering device do not in any way exclude existence of any conventional UPnP/DLNA functionality in the same physical device. The new functionality may be implemented as a further improvement to any existing DLNA-compliant rendering system element.

The invention thus describes a system that comprises a rendering server, a rendering device, and a control device. In the system the control device and the rendering device comprise a browser; the browser of the control device is configured to apply a web address of the rendering server, thereby establishing a first web link; the browser of the rendering device is configured to apply a web address of the rendering server, thereby establishing a second web link; the control device is configured to send first control information identifying the rendering device and a content data item for rendering over the first web link to the rendering server; the rendering server is configured to, in response to receiving the first control information, generate second control information including rendering control commands for rendering the identified content data item, and sending the second control information to the identified rendering device over the second web link; and the rendering device is configured to render the content data item according to the rendering control commands received from the rendering server.

In a further modification, the browser of the rendering device and/or of the control device may be configured to apply the web address of the rendering server by a user inputting the web address or by reading a pre-installed web address.

In a further modification, the rendering device may be configured to use the second web link to provide to the rendering server a service announcement indicating its ability to render content data items; and the rendering server may be configured to, in response to the service announcement, register the rendering device to be standby for rendering.

In a further modification, the standby rendering device may be configured to periodically use the second web link to send an update message to the rendering server, the update message indicating continued standby state of the rendering device.

In a further modification, the rendering server may be configured to reply to the update message with an activation message including a rendering control command to initiate rendering of a content data item in the rendering device.

In a further modification, the activation information may include a web address of a resource providing the content item.

In a further modification, the activation information may include HTML5, HTML or XHTML formatted page that can be interpreted by the browser to include the content item to be rendered.

In a further modification, the service announcement may comprise information on rendering capabilities supported by the rendering device.

In a further modification, the second web link may comprise two or more parallel connections applying different transport protocols.

In a further modification, the rendering device may be configured to decrease the period between update messages in response to receiving the activation message.

In a further modification, the rendering server may be configured to maintain a list of rendering devices associated with the user and provide this list as a list of rendering devices available to the user.

In a further aspect, the rendering server may be configured to generate, in response to receiving the first control information from the control device, a random pin and information triggering display of the generated pin in the rendering device, and send the information to the rendering device over the first web link; the rendering server may be configured to check whether the same pin is received from the control device over the second web link; and the rendering server may be configured to confirm authority of the user to use the rendering device if the same pin is received from the control device.

In a further aspect, the rendering device or the control device may be configured to send content update information to the rendering server, the content update information comprising information on content data items stored to the device from another source than the rendering server.

In another aspect, the invention describes a method for rendering content items in a system, comprising a rendering server, a rendering device, a control device, wherein the control device and the rendering device comprise a browser. The method comprises establishing a first web link by configuring the browser of the control device to apply a web address of the rendering server; establishing a second communication by configuring the browser of the rendering device to apply a web address of the rendering server; sending first control information identifying the rendering device and a content data item for rendering over the first web link from the control device to the rendering server; generating, in response to receiving the first control information, in the rendering server second control information including rendering control commands for rendering the identified content data item, and sending the second control information to the identified rendering device over the second web link; and rendering the content data item in the rendering device according to the rendering control commands received from the rendering server.

In another aspect, the invention describes a method for rendering of content items by a control device for a system comprising a rendering server, a rendering device, and a control device. the method comprises establishing a web link to the rendering server by configuring a browser of the control device to request information from the rendering server; using the web link to access from the rendering server information on content data items for rendering; and using the web link to send to the rendering server control information identifying a content data item and a rendering device to be used for rendering.

The method may also comprise receiving the web address to apply by a user inputting the web address or by reading a web address pre-installed into the control device.

In another aspect, the invention describes a method for controlling rendering of content items by a rendering server for a system comprising a rendering server, a rendering device, and a control device. the method comprises establishing a first web link by receiving a browser request including a service announcement indicating ability to render content data items from the control device; establishing a second web link by receiving a browser request from the rendering device; receiving first control information identifying the rendering device and a content data item for rendering over the first web link from the control device; and generating, in response to receiving the first control information, second control information including rendering control commands for rendering the identified content data item, and sending the second control information to the identified rendering device over the second web link.

The method may also comprise receiving from the registered rendering device a periodic update message to the rendering server, the update message indicating a standby state to render content data items; and replying, in response to receiving the first control information, to the update message with an activation message including a rendering control command to trigger rendering of a content data item.

The method may also comprise including in the activation information address of a location of a resource providing the content item.

The method may also comprise maintaining two or more parallel connections applying different transport protocols for the second web link.

The method may also comprise maintaining a list of rendering devices used by a user of the control device; and providing this list as the list of rendering devices available to the user.

The method may also comprise generating, in response to receiving information on selected content item from the control device, a random pin and information triggering display of the generated pin in the rendering device, and sending the information to the rendering device over the first web link; checking whether the same pin is received from the control device over the second web link; and confirming authority of the user to use the rendering device if the same pin is received from the control device.

In another aspect, the invention describes a method for rendering content items by a rendering device for a system comprising a rendering server, a rendering device, a control device. the method comprises configuring a browser of the rendering device with a web address of the rendering server to establishing a web link to the rendering server; receiving over the web link from the rendering server control information including rendering control commands for rendering an identified content data item; and rendering the content data item according to the rendering control commands received from the rendering server.

The method may also comprise receiving the web address to apply by a user inputting the web address or by reading a web address pre-installed into the rendering device.

The method may also comprise periodically sending over the web link an update message to the rendering server, the update message indicating a standby state to render content data items.

The method may also comprise maintaining two or more parallel connections applying different transport protocols for the second web link.

The method may also comprise decreasing the period between update messages in response to receiving the activation message.

In another aspect, the invention describes a computer program product, readable by a computer and encoding instructions for executing any of the described methods in a control device, rendering server or rendering device of a rendering system.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A system, comprising a rendering server, a rendering device, and a control device; wherein
the control device and the rendering device comprise a browser;
the browser of the control device is configured to apply a web address of the rendering server, thereby establishing a first web link;
the browser of the rendering device is configured to apply a web address of the rendering server, thereby establishing a second web link;
the control device is configured to send a browser request including first control information identifying the rendering device and a content data item for rendering over the first web link to the rendering server;
the rendering server is configured to, in response to receiving the first control information, generate second control information including rendering control commands for rendering the identified content data item, the second control information including the first control information in a web page that automatically triggers rendering in the rendering device; and sending the second control information to the identified rendering device over the second web link; and
the rendering device is configured to render the content data item according to the rendering control commands received in the web page from the rendering server.

2. A system according to claim 1, wherein the rendering device is configured to periodically use the second web link to send an update message to the rendering server, the update message maintaining standby state of the rendering device for receiving rendering control commands.

3. A system according to claim 2, wherein the rendering device is configured to decrease the period between update messages in response to receiving an activation message.

4. A system according to claim 1, wherein the rendering server and the rendering device are configured to maintain two or more parallel connections applying different transport protocols for the second web link.

5. A system according claim 1, wherein the rendering server is configured to associate the user with one or more rendering devices; maintain a list of rendering devices associated with the user and provide this list to the control device to be output to the user.

6. A system according to claim 1, wherein
the rendering server is configured to generate, in response to receiving the first control information from the control device, a random pin and information triggering display of the generated pin in the rendering device, and send the information to the rendering device over the first web link;

the rendering server is configured to check whether the same pin is received from the control device over the second web link;

the rendering server is configured to confirm authority of the user to use the rendering device if the same pin is received from the control device.

7. A system according to claim 1, wherein the rendering device or the control device is configured to send content update information to the rendering server, the content update information comprising information on content data items stored to the device from another source than the rendering server.

8. A method for relaying rendering of content items, the method comprising:
- operating as a rendering server in a rendering system;
- establishing, at the rendering server, a first web link by receiving a browser request from a control device;
- establishing, at the rendering server, a second web link by receiving a browser request from a rendering device;
- receiving, at the rendering server, first control information identifying the rendering device and a content data item for rendering over a browser request in the first web link from the control device; and
- generating, by the rendering server, in response to receiving the first control information, second control information including rendering control commands for rendering the identified content data item, the second control information including the first control information in a web page that automatically triggers rendering in the rendering device, and sending the web page including the second control information to the identified rendering device over the second web link.

9. A computer program, for relaying rendering of content items, the computer program being embodied in a non-transitory computer readable medium, and comprising computer instructions for:
- operating as a rendering server in a rendering system;
- establishing, at the rendering server, a first web link by receiving a browser request from a control device;
- establishing, at the rendering server, a second web link by receiving a browser request from a rendering device;
- receiving, at the rendering server, first control information identifying the rendering device and a content data item for rendering over a browser request in the first web link from the control device; and
- generating, by the rendering server, in response to receiving the first control information, second control information including rendering control commands for rendering the identified content data item, the second control information including the first control information in a web page that automatically triggers rendering in the rendering device, and sending the web page including the second control information to the identified rendering device over the second web link.

10. A rendering server for a system comprising the rendering server, a rendering device, and a control device, the rendering server comprising:
- means for establishing a first web link by receiving a browser request from the control device;
- means for establishing a second web link by receiving a browser request from the rendering device;
- means for receiving first control information identifying the rendering device and a content data item for rendering over a browser request in the first web link from the control device;
- means for generating in response to receiving the first control information, second control information including rendering control commands for rendering the identified content data item, the second control information including the first control information in a web page that automatically triggers rendering in the rendering device, and sending the web page including the second control information to the identified rendering device over the second web link.

* * * * *